US009650023B2

(12) United States Patent
Adams et al.

(10) Patent No.: US 9,650,023 B2
(45) Date of Patent: May 16, 2017

(54) COOLING CIRCUIT FOR A MOTOR VEHICLE HAVING A HYDRODYNAMIC RETARDER

(71) Applicants: MAN Truck & Bus AG, München (DE); Voith Patent GmbH, Heidenheim (DE)

(72) Inventors: Werner Adams, Crailsheim (DE); Manfred Beck, Wallhausen-Hengstfeld (DE); Matthias Gottschall, Moos (DE); Manfred Mandlik, Kressberg (DE); Achim Menne, Crailsheim (DE); Dietmar Sturm, Postbauer-Heng (DE); Thomas Bauer, Schwanstetten (DE)

(73) Assignees: MAN Truck & Bus AG, München (DE); Voith Patent GmbH, Heidenheim (DE)

( * ) Notice: Subject to any disclaimer, the term of this patent is extended or adjusted under 35 U.S.C. 154(b) by 111 days.

(21) Appl. No.: 14/814,850

(22) Filed: Jul. 31, 2015

(65) Prior Publication Data

US 2016/0068142 A1   Mar. 10, 2016

Related U.S. Application Data

(63) Continuation of application No. PCT/EP2014/051594, filed on Jan. 28, 2014.

(30) Foreign Application Priority Data

Jan. 31, 2013 (DE) .................. 10 2013 001 657

(51) Int. Cl.
*B60T 1/087* (2006.01)
*F16D 57/04* (2006.01)
(Continued)

(52) U.S. Cl.
CPC ............... *B60T 1/087* (2013.01); *B60T 5/00* (2013.01); *B60T 10/02* (2013.01); *F01P 3/20* (2013.01);
(Continued)

(58) Field of Classification Search
CPC ........ F16D 57/04; F16D 57/005; F16D 65/78; B60T 10/02; B60T 1/087; B60T 10/04; F01P 3/20; F01P 2060/06; F01P 2007/143
(Continued)

(56) References Cited

U.S. PATENT DOCUMENTS 8,925,694 B2 * 1/2015 Laukemann ............ B60T 10/02
    188/264 D
2002/0148691 A1 * 10/2002 Friedrich ................ B60T 1/087
    188/296

(Continued)

FOREIGN PATENT DOCUMENTS

DE       1 530 672        10/1969
DE    196 16 427 A1        5/1997
(Continued)

OTHER PUBLICATIONS

Chinese Office Action dated Sep. 29, 2016 for Chinese Application No. 201480006977.2 (15 pages).
(Continued)

*Primary Examiner* — Long T Tran
(74) *Attorney, Agent, or Firm* — Taylor IP, P.C.

(57) ABSTRACT

A cooling circuit for a motor vehicle having a cooling medium pump that circulates a cooling medium in the cooling circuit having a hydrodynamic retarder. The cooling circuit further includes a main circuit in which the cooling medium pump and a drive motor of the motor vehicle, as well as a heat exchanger are positioned. A secondary branch of the cooling circuit includes a feed that branches off from
(Continued)

the main circuit at a branch-off point and ends in the hydrodynamic retarder, and a return which proceeds from the hydrodynamic retarder and ends at a junction location in the main circuit. The return ends upstream of the branch-off location of the feed as viewed in a flow direction of the cooling medium in the main circuit, however on the same side of the cooling medium pump or at the branch-off location of the feed in the main circuit.

20 Claims, 5 Drawing Sheets (51) Int. Cl.
*F01P 7/14* (2006.01)
*B60T 10/02* (2006.01)
*F01P 3/20* (2006.01)
*B60T 5/00* (2006.01)
*F01P 5/12* (2006.01)
*F16D 65/78* (2006.01)

(52) U.S. Cl.
CPC ...... *F01P 5/12* (2013.01); *F01P 7/14* (2013.01); *F16D 57/04* (2013.01); *F01P 2060/06* (2013.01); *F16D 2065/782* (2013.01)

(58) Field of Classification Search
USPC ........ 123/41.01, 41.44, 41.21; 188/290, 296, 188/274
See application file for complete search history.

(56) References Cited

U.S. PATENT DOCUMENTS

| 2009/0217889 A1* | 9/2009 | Bartosch | F01K 23/065 123/41.21 |
| 2010/0147641 A1* | 6/2010 | Laukemann | B60T 10/02 188/274 |
| 2011/0203668 A1* | 8/2011 | Hofig | F01M 1/02 137/1 |
| 2012/0222633 A1* | 9/2012 | Barthelmas | F01P 5/12 123/41.44 |
| 2013/0205925 A1* | 8/2013 | Huth | B60T 10/02 74/15.82 |

FOREIGN PATENT DOCUMENTS

| DE | 297 07 304 U1 | 10/1998 |
| EP | 0 719 683 A2 | 7/1996 |
| EP | 1 251 050 A2 | 10/2002 |
| EP | 1 646 771 B1 | 9/2012 |
| WO | 97/33077 A1 | 9/1997 |

OTHER PUBLICATIONS

German Office Action dated Oct. 14, 2013 for German Application No. 10 2013 001 657.6 (7 pages).
International Search Report and Written Opinion dated Jun. 12, 2014 for International Application No. PCT/EP2014/051594 (11 pages).

* cited by examiner

COOLING CIRCUIT FOR A MOTOR VEHICLE HAVING A HYDRODYNAMIC RETARDER

CROSS REFERENCE TO RELATED APPLICATIONS

This is a continuation of PCT application No. PCT/EP2014/051594, entitled "COOLING CIRCUIT FOR A MOTOR VEHICLE HAVING A HYDRODYNAMIC RETARDER", filed Jan. 28, 2014, which is incorporated herein by reference.

BACKGROUND OF THE INVENTION

1. Field of the Invention

The present invention relates to a cooling circuit for a motor vehicle, and, more particularly, to a cooling circuit for a motor vehicle in which a hydrodynamic retarder is located.

2. Description of the Related Art

In addition to so-called oil retarders which are operated with oil as the working medium that is circulated in a proprietary working medium circuit of the retarder, so-called water retarders are known which are tied directly into the cooling circuit of a motor vehicle which, as a rule is operated with water or a water mixture as the cooling medium. Accordingly, the working medium of the retarder is at the same time the cooling medium of the cooling circuit.

Whereas in the case of the previously mentioned oil retarders an additional heat exchanger must be provided in order to remove the heat that is generated during braking operation of the hydrodynamic retarder from the working medium, for example into the cooling circuit of the motor vehicle, such a separate heat exchanger may be foregone in the case of the water retarders, since the heat of the hydrodynamic retarder is absorbed in the retarder immediately by the cooling medium and can therefore be removed via the heat exchanger of the cooling circuit (motor vehicle radiator) that is provided anyhow.

Examples of such hydrodynamic retarders that are tied into the cooling circuit of the motor vehicle and which relate to the current invention are disclosed in the following publications: EP 0 719 683 A2; DE 297 07 304 U1; DE 196 16 427 A1; EP 1 251 050 B1; DE 1 530 672 A; and EP 1 646 771 B1.

In practice it has been proven to be disadvantageous that—due to the direct integration of the hydrodynamic retarder into the cooling circuit of the motor vehicle—an increased flow resistance for the cooling medium may occur which has to be overcome by the cooling medium pump. In unfavorable circumstances therefore, utilization of a cooling medium pump having a comparatively greater output compared to cooling circuits without hydrodynamic retarders becomes necessary. According to EP 1 646 771 B1 various measures are suggested in order to avoid the necessity of a more powerful cooling medium pump which can lead to increased fuel consumption.

WO 97/33077 describes one design example with a hydrodynamic retarder in the cooling circuit of a motor vehicle wherein an especially minimal retarder braking torque can be adjusted through a short-circuit circuit that branches off downstream of the hydrodynamic retarder and ends upstream from the cooling medium pump.

Due to the increasing importance of an as low a power consumption as possible of the cooling medium pump the requirement to reduce the flow resistance in a cooling circuit for a motor vehicle with a directly tied-in hydrodynamic retarder exists in spite of the already suggested measures.

What is needed in the art is an improved cooling circuit for a motor vehicle.

SUMMARY OF THE INVENTION

The present invention provides a cooling circuit for a motor vehicle that permits especially low-loss integration of the hydrodynamic retarder into the cooling circuit.

The inventive cooling circuit for a motor vehicle comprises a cooling medium pump which circulates a cooling medium in the cooling circuit. Moreover, a hydrodynamic retarder is provided, comprising a bladed primary wheel and a bladed secondary wheel which together form a working chamber that can be filled with a working medium. By means of driving the primary wheel a hydrodynamic circulation flow of the working medium can be produced, by means of which driving power is transferred hydro-dynamically from the primary wheel to the secondary wheel, thus slowing down the primary wheel. The secondary wheel can be designed as a non-circulating stator or as a stator circulating in an opposite direction to the primary wheel.

According to the invention the cooling medium of the cooling circuit is at the same time the working medium of the hydrodynamic retarder.

The cooling circuit comprises a main circuit in which the cooling medium pump is positioned. Moreover, a drive motor and/or another unit of the motor vehicle are provided in the main circuit which is/are being cooled by means of the cooling medium. Finally, a heat exchanger is positioned in the main circuit for removing the heat of the cooling medium absorbed by the drive motor or the other unit, so that by means of driving the cooling medium pump—which has a drive connection with the drive motor or which can also be driven by another motor—the cooling medium can be circulated in the main circuit in order to first absorb the heat in the drive motor and/or the other unit and to subsequently remove it in the heat exchanger, for example to the environment or to a secondary circuit.

According to the invention the hydrodynamic retarder is positioned in a secondary branch of the cooling circuit. The secondary branch includes a feed which branches off from the main circuit at a branch-off location and ends in the hydrodynamic retarder, as well as a return which proceeds from the hydrodynamic retarder and ends in the main circuit at a junction location. Cooling medium as the work medium of the hydrodynamic retarder can thus be branched off from the main circuit, directed through the feed into the work chamber of the hydrodynamic retarder and can as a rule after passing through the hydrodynamic circulation flow be fed again via the return from the work chamber of the hydrodynamic retarder to the main circuit.

According to the invention the return ends upstream of the branch-off location of the feed as viewed in the flow direction of the cooling medium in the main circuit, or at the branch-off location of the feed in the main circuit. This means that no outlet of the return downstream from the branch-off location of the feed is provided, as was the case in the past, but possibly in the region of a common junction of the branch-off location and the junction location in the main circuit. If the return—viewed in the flow direction of the cooling medium in the main circuit—ends upstream of the branch-off location of the feed, then the outlet of the return and the branch-off location of the feed are positioned on a common side of the cooling medium pump in the main circuit. In other words, either together downstream from the cooling medium pump, in other words on its pressure side, or together upstream of the cooling medium pump, in other words on its suction side.

A common junction of this type, or respectively an outlet of the return at the branch-off location of the feed are understood to be all arrangements whereby the outlet is provided in the same axial section of the main circuit as the branch-off location. As a rule, the flow cross section of the outlet and the flow cross section of the branch-off do not coincide, but are for example offset relative to each other over the circumference of the flow cross section of the main circuit. It is also possible to make provision in the region of the outlet location and the branch-off location for a collective cross section, so that for example the feed—viewed in the flow direction of the cooling medium in the main circuit—branches off axially beside the return, above same or below same.

One embodiment of the invention provides that the branch-off location of the feed in the main circuit does not include a valve that redirects the flow into the feed, in particular does not include any valve. In addition or alternatively the junction location of the return in the main circuit may also not include a valve that adjusts the flow in the return, in particular does not include any valve.

Another embodiment provides that at least in the region of the junction location and the branch-off location the main circuit is formed by a main channel, the feed by a feed channel and the return by a return channel, whereby the various channels may for example be integrated in one common component, in particular a cast component, and a first axial section of the main channel which—viewed in the flow direction of the cooling medium in the main circuit—is located immediately upstream of the branch-off location, parallel to the axial direction of an axial section of the feed channel that connects directly to the branch-off location, in particular that aligns with same. A further development of the arrangement provides that a second axial section of the main channel which—viewed in the flow direction of the cooling medium in the main circuit—is located immediately downstream from the branch-off location surrounds the axial section of the feed channel in the circumferential direction, or is surrounded by the same in the circumferential direction.

One embodiment provides that a second axial section of the main channel which—viewed in the flow direction of the cooling medium in the main circuit—is located immediately downstream of the branch-off location, proceeds parallel to the axial direction of an axial section of the return channel that connects directly with the junction location, in particular that aligns with same.

An additional embodiment provides that, as previously discussed at least in the region of the junction location and the branch-off location the main circuit is formed by a main channel, the feed by a feed channel and the return by a return channel, and now deviating therefrom a first axial section of the main channel which—viewed in the flow direction of the cooling medium in the main circuit—is located immediately upstream of the branch-off location, proceeds parallel to the axial direction of a second axial section of the main channel which—viewed in the flow direction of the cooling medium in the main circuit—is located immediately downstream of the branch-off location, in particular that aligns with same.

An additional embodiment results when an axial section of the feed channel that connects directly at the branch-off location proceeds parallel to the axial direction of an axial section of the return channel that connects directly to the junction location, in particular aligns with same. A further advancement provides that the axial section of the return channel is positioned offset in axial direction relative to the axial section of the feed channel, in particular above or below same.

The first axial section and the second axial section of the main channel may connect directly with each other and thus form a linear flow channel having a uniform cross section, in particular having a circular or elliptical cross section. In this arrangement the feed thus branches off at an angle or vertically from a tubular channel. The return may also discharge accordingly into this flow channel, upstream from the branch-off location or in the region of the branch-off location or respectively at the branch-off location.

According to one embodiment the feed has a smaller flow cross-section than the main circuit, at least with regard to the flow cross-section of the main circuit in the region of the branch-off location. In addition or alternatively, the return may also have a smaller flow cross-section than the main circuit, in particular in regard to the flow cross-section of the main circuit at the junction location. Alternatively the flow cross-section of the feed and/or return and in particular of the entire secondary branch may also be larger than the flow cross-section of the main circuit, at least in the region of the branch-off location.

One embodiment provides that the branch-off location and the junction location are positioned in the flow direction of the cooling medium in the main circuit after the cooling medium pump and thus on the pressure side of same. The section in the main circuit between the cooling medium pump and the branch-off location as well as the junction location can hereby be without a flow-regulating device and/or a device that is to be cooled, or respectively the drive motor.

One embodiment provides that the branch-off location and the junction location in the flow direction of the cooling medium in the main circuit are positioned before the drive motor or the other unit that is being cooled by the cooling medium. In this case too it may be provided that between the branch-off location or respectively the junction location and the drive motor or respectively the other unit no flow-regulating valve and/or other unit that is to be cooled are provided.

According to another embodiment the return ends in a pipe socket in the main circuit, whereby the outlet end of the pipe socket protrudes into the cooling medium flow in the main circuit. The outlet location is therefore provided not directly at the outer circumference of the flow cross-section of the main circuit, but further in the direction of the center of the flow cross-section of the main circuit. As is explained subsequently with reference to an embodiment, the cooling medium that is leaving the return can be directed completely or at least to a large extent via the inlet cross-section of the feed.

In the secondary branch of the cooling circuit with the hydrodynamic retarder a bypass may be provided to bypass the hydrodynamic retarder which branches off from the feed and discharges in the return. The bypass and in particular the branch-off location and/or the junction location of the bypass can be without flow-regulating valves, or any valves.

A shut-off valve can be provided in the feed for selective release or shut-off of the flow cross-section of the cooling medium to the hydrodynamic retarder. Such a shut-off valve may in particular be designed as a black-white/on-off valve, in other words without intermediate positions for partial shut-off of the flow cross-section.

A control valve may be provided in the return for variable adjustment of the flow cross-section of the cooling medium leaving the retarder. This control valve comprises intermediate positions for partial shut off of the flow cross section, as well as a position for complete shut-off of the flow cross-section and a position for complete release of the flow cross-section and is, for example, designed as a continuously adjusting valve.

BRIEF DESCRIPTION OF THE DRAWINGS

The above-mentioned and other features and advantages of this invention, and the manner of attaining them, will become more apparent and the invention will be better understood by reference to the following descriptions of the embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
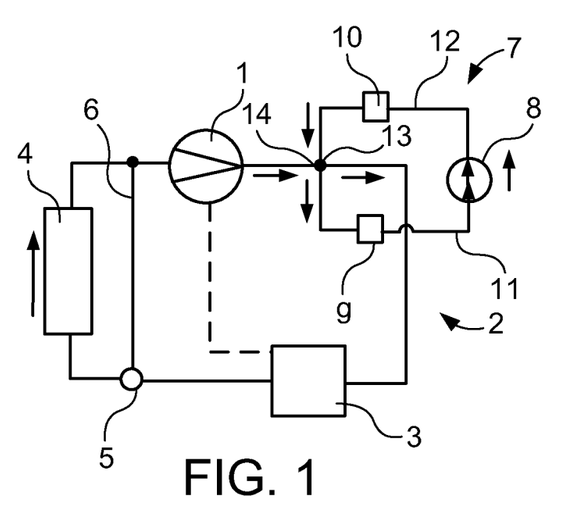
FIG. 1 is a schematic illustration of a first embodiment of a cooling circuit according to the invention having a hydrodynamic retarder connected via a junction point.

Referring now to the drawings, and more particularly, to FIG. 1, there is shown a cooling circuit of a motor vehicle, whereby a cooling medium pump 1 pumps a cooling medium through a main circuit 2, wherein in addition to cooling medium pump 1 a drive motor 3 and a heat exchanger 4 are provided. As indicated by the broken line, cooling medium pump 1 can be driven for example by drive motor 3 which moreover drives the motor vehicle's drive wheels which are not illustrated in detail here.

The cooling medium that was heated in drive motor 3 is cooled in heat exchanger 4. In the illustrated embodiment a heat exchanger bypass 6 that is controllable via a thermostat valve 5 is provided in main circuit 2 of the cooling circuit.

In a secondary branch 7 a hydrodynamic retarder 8 is positioned which is driven by the cooling medium as the working medium. Viewed in the flow direction of the cooling medium in secondary branch 7 a shut-off valve 9 is provided before (upstream) hydrodynamic retarder 8 with which the flow cross section in a feed 11 which leads to hydrodynamic retarder 8 can selectively be closed or opened. Viewed in the flow direction of the cooling medium in secondary branch 7 a control valve 10 is provided after (downstream) the hydrodynamic retarder 8 with which the flow cross section for cooling medium from hydrodynamic retarder 8 and thus in return 12 can be variably controlled in order to vary the braking torque of hydrodynamic retarder 8.

In the embodiment illustrated in FIG. 1, return 12 ends at the location in main circuit 2, where also branch-off location 13 of feed 11 is provided. Consequently, a bypass in main circuit 2 to hydrodynamic retarder 8 that would extend the flow-conducting axial length of main circuit 2 and would thus lead to a comparatively greater flow loss can be avoided.

Figure 2:
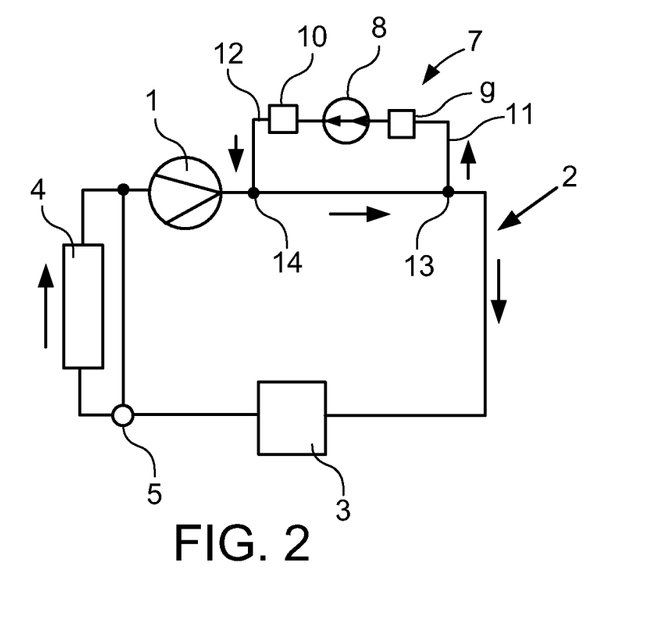
FIG. 2 is a schematic illustration of an embodiment of the invention, wherein the return is connected upstream from the branch-off location of the feed on the main circuit.

The embodiment according to FIG. 2 is consistent to a great extent with that in FIG. 1 and corresponding components are identified with the same identification numbers. Deviating from this however, in this case return 12 ends—viewed in the flow direction of the cooling medium—in main circuit 2, upstream from branch-off location 13 of feed 11. In this example of positioning junction location 14 and branch-off location 13 on the pressure side of cooling medium pump 1, junction location 14 of return 12 is therefore positioned closer to cooling medium pump 1 than branch-off location 13. In contrast, in the embodiment according to FIG. 1 junction location 14 and branch-off location 13 were positioned approximately at the same distance from cooling pump 1.

Also, in the embodiment according to FIG. 2, no bypass is provided in main circuit 2 to hydrodynamic retarder 8 through which a portion of the cooling medium that does not flow through hydrodynamic retarder 8 is diverted around hydrodynamic retarder 8.

Examples of other embodiments are now explained with reference to FIGS. 3 to 8; in other words embodiments wherein junction location 14 is positioned at branch-off location 13 in main circuit 2. The illustrated embodiments can however also be arranged to deviate, whereby the junction location 14 is located upstream of branch-off location 13 in main circuit 2.

In all the arrangements discussed below, in the region of branch-off location 13 and junction location 14, main circuit 2 is formed by a main channel 15 which comprises a first axial section 15.1, viewed in the flow direction of the cooling medium in main circuit 2, immediately upstream from branch-off location 13, and a second axial section 15.2, viewed in the flow direction of the cooling medium in main circuit 2, immediately downstream from branch-off location 13. Feed 11 is formed by a feed channel 16 and return 12 is formed by a return channel 17.

Figure 3:
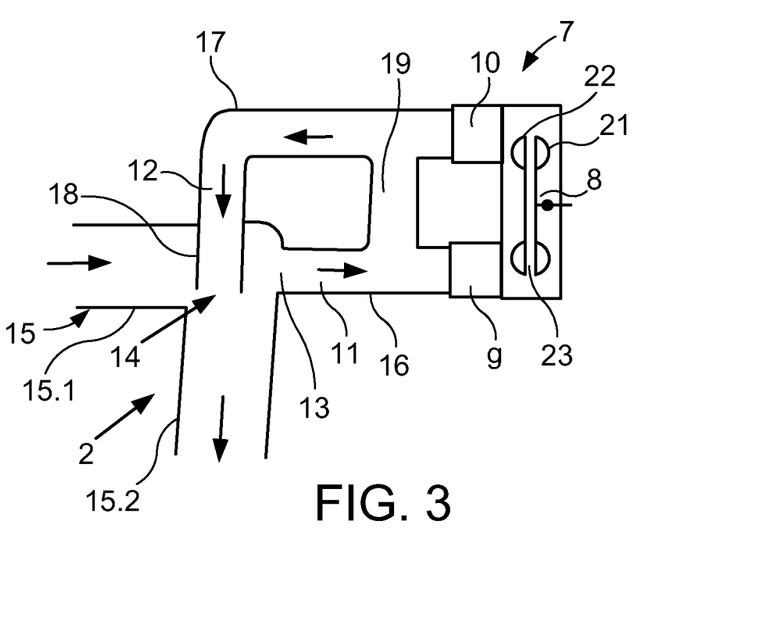
FIG. 3 is an illustration of an embodiment of a junction point for the connection of the secondary branch with the hydrodynamic retarder on the main circuit.

According to FIG. 3, the axial direction of feed channel 16 of feed 11 is positioned parallel, in particular aligned with the axial direction of first axial section 15.1 of main channel 15; and the axial direction of return channel 17 of return 12 is oriented parallel, in particular aligned with the axial direction of second axial section 15.2 of main channel 15—always related to the axial section of feed channel 16 or respectively return channel 17 that connects immediately to branch-off location 13 or respectively junction location 14.

In the embodiment illustrated in FIG. 3, return channel 17 moreover comprises a pipe socket 18 whose outlet end protrudes into the cooling medium flow in main circuit 2, in other words in first axial section 15.1 of main channel 15.

Pipe socket 18 may hereby protrude thus far into first axial section 15.1 that it covers the flow area of branch-off location 13 partially or completely in order to thus prevent that cooling medium flowing from return 12 flows again immediately into feed 11 and instead flows again through main circuit 2, namely in second axial section 15.2 of main circuit 15.

In the embodiment illustrated in FIG. 3, a bypass 19 is moreover provided in secondary branch 7 through which the cooling medium that is not routed through hydrodynamic retarder 8 can flow.

FIG. 3 illustrates schematically the structure of retarder 8 with a primary wheel 21 and a secondary wheel 22. Primary wheel 21 and secondary wheel 22 are located opposite one another in axial direction and between them form a working chamber 23.

Figure 4:
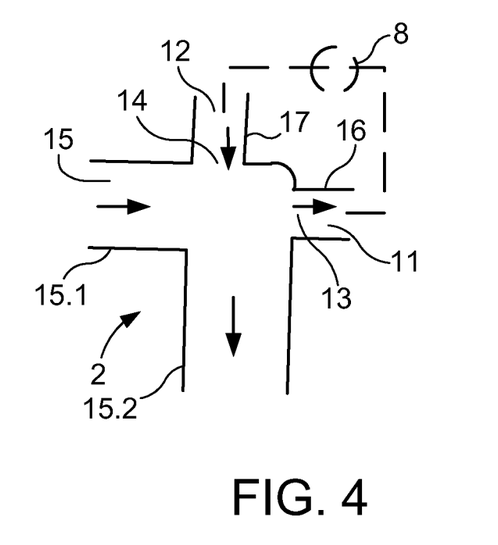
FIG. 4 is an illustration of an additional embodiment for the design of the junction point.

The embodiment according to FIG. 4 is consistent to a great extent with that in FIG. 3. However, in this case no bypass is provided in secondary branch 7 and nor is a pipe socket 18 that protrudes into main channel 15.

Figure 5:
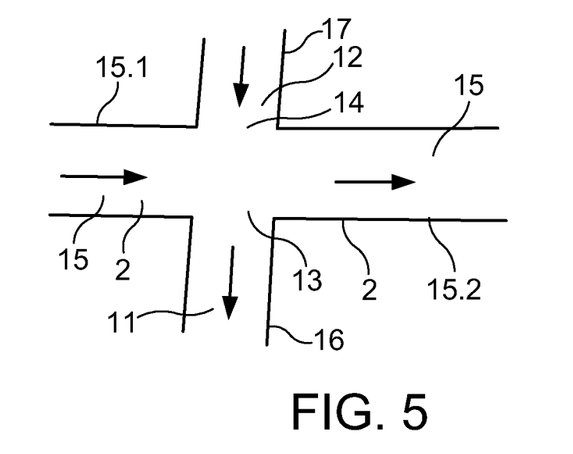
FIG. 5 is an illustration of an arrangement of the junction point, so that the main branch can be designed to be linear in the region of the junction point.

According to the arrangement illustrated in FIG. 5 the first axial section 15.1 of main channel 15 is positioned axially parallel, in particular aligned with second axial section 15.2. Moreover, feed channel 16 of feed 11 is positioned axially parallel or aligned with return channel 17 of return 12.

Figure 6:
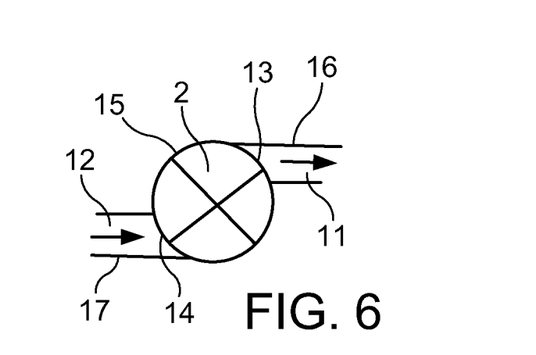
FIG. 6 is an illustration of a possible positioning of the feed in axial direction, parallel, however offset relative to the return.

One option is illustrated in FIG. 6 to position feed channel 16 parallel, however offset to return channel 17. This prevents that cooling medium flowing from return 12 into main channel 15 immediately flows again into feed 11.

Figure 7:
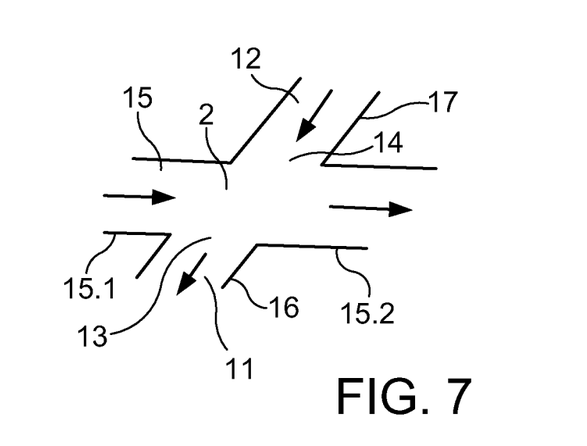
FIG. 7 is an illustration of an example of a junction point, not having a vertical progression of the feed and return to the main branch.

The arrangement in FIG. 7 is consistent to a great extent with that in FIG. 5, however, feed channel 16 and return channel 17 are not positioned vertically, but instead at an angle on main channel 15.

In FIGS. 5 and 7 it is indicated that the flow cross sections of feed channel 16 and in particular of entire feed 11 and/or the flow cross section of return channel 17 and in particular of the entire return 12 can be at least substantially consistent with the flow cross section of main channel 15. In contrast, in the embodiments according to FIGS. 3, 4 and 6 it is indicated that these have a comparatively smaller flow cross section. This may however also be provided for differently in the respective illustrated embodiments.

Figure 8:
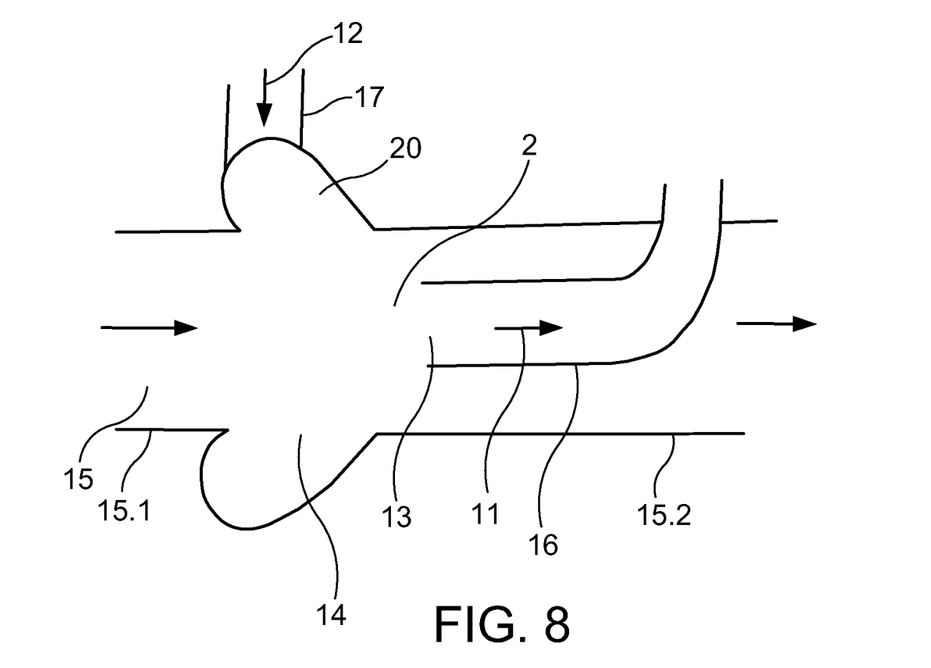
FIG. 8 is an illustration of an embodiment, wherein the feed is surrounded concentrically by the flow channel of the main circuit.

An embodiment is illustrated in FIG. 8 wherein feed channel 16 is surrounded in circumferential direction by second axial section 15.2 of main channel 15 and return channel 17 of return 12 ends in an annular channel 20 at main channel 15.

Figure 9:
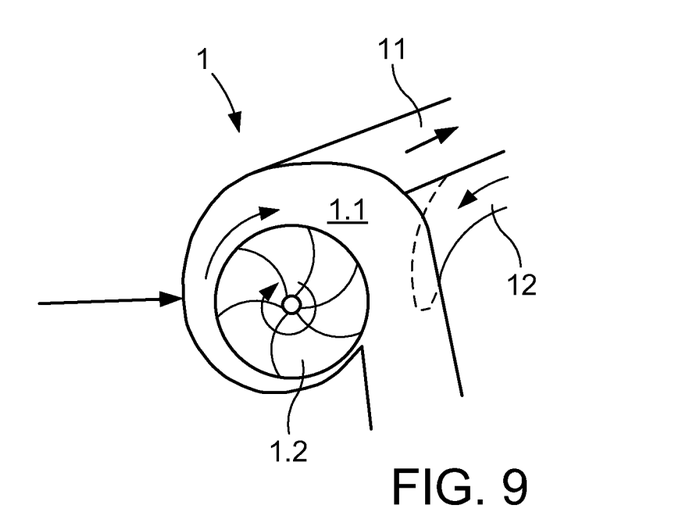
FIG. 9 is an illustration of en embodiment, whereby the feed and the return are connected on the spiral channel of the cooling medium pump on its pressure side.

According to FIG. 9 cooling medium pump 1 has a spiral channel 1.1 in which pump impeller 1.2 moves the cooling medium. The cooling medium exits cooling medium pump 1 via spiral channel 1.1. Feed 11, as well as return 12 are connected to spiral channel 1.1. In other words, feed 11 branches off same and return 12 ends at same—immediately adjacent next to one another.

The flow cross section of spiral channel 1.1 increases with increasing flow length of spiral channel 1.1, in other words with increasing length of spiral channel 1.1 in the flow direction of the working medium, since increasingly more cooling medium which exits over the circumference from pump impeller 1.2 is collected.

As indicated by the broken line, the outlet of return 12 can comprise a nozzle for the cooling medium that is leaving the hydrodynamic retarder (not illustrated in FIG. 9), so that the cooling medium flowing through spiral channel 1.1 is dragged along as in the case of a water jet pump. In braking operation the hydrodynamic retarder 8 exerts a considerable pumping effect upon the medium, so that a corresponding feed effect develops at the nozzle.

The concept of an arrangement of a nozzle at the end of the return 12 of the hydrodynamic retarder 8 can also be pursued independent of the positioning of the return 12 in the cooling circuit, also in regard to its position relative to the feed 11.

Deviating from the illustration in FIG. 9, return 12 could moreover end in the flow direction of the cooling medium through spiral channel 1.1 before feed 11 in spiral channel 1.1, possibly in the embodiment of a nozzle that protrudes partially or completely over the inflow cross section of feed 11.

Figure 10:
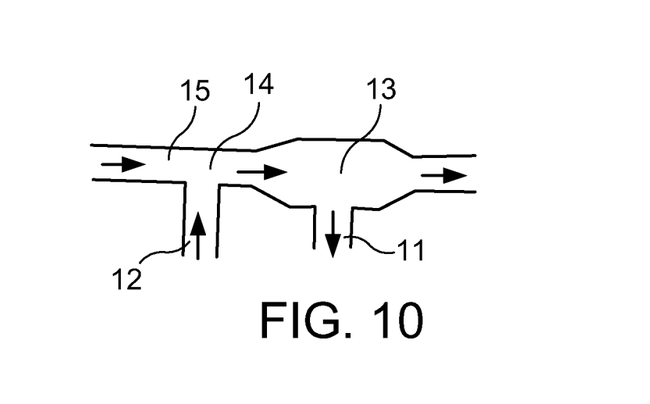
FIG. 10 is an illustration of an embodiment with various flow cross sections of the main channel at the branch-off location and the junction location.

According to FIG. 10, main channel 15 has a smaller flow cross section at junction location 14 of return 12 than at the branch-off location 13 of feed 11. Due to the lower flow speed of the cooling medium the dynamic pressure in main channel 15 at branch-off location 13 is thus less than at junction location 14, due to which the static pressure is accordingly higher. This promotes flow through the secondary branch 7 with the hydrodynamic retarder 8 (not illustrated in detail in FIG. 10).

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A cooling circuit for a motor vehicle, comprising:
   a main circuit, including:
     a cooling medium pump that circulates a cooling medium in said cooling circuit and said main circuit;
     a drive motor of the motor vehicle; and
     a heat exchanger, wherein said cooling medium pump and the drive, as well as the heat exchanger are configured to remove a heat of the cooling medium absorbed by the drive motor; and
   a secondary branch, including:
     a hydrodynamic retarder positioned in the secondary branch of the cooling circuit, said hydrodynamic retarder including:
       a bladed primary wheel and a bladed secondary wheel which together define a working chamber that can be filled with a working medium, wherein the working medium is said cooling medium;
     a feed which branches off from said main circuit at a branch-off location and ends in said hydrodynamic retarder; and
     a return which proceeds from said hydrodynamic retarder and ends at a junction location in said main circuit, wherein said return ends at least one of substantially at said branch-off location of the feed in the main circuit and at least partially upstream of said branch-off location of the feed as viewed in a flow direction of the cooling medium in said main circuit, however on a common side of the cooling medium pump in said main circuit.

2. The cooling circuit according to claim 1, wherein said branch-off location of said feed in said main circuit does not include a valve.

3. The cooling circuit according to claim 1, wherein said junction location of said return in said main circuit does not include a valve.

4. The cooling circuit according to claim 2, wherein said junction location of said return in said main circuit does not include a valve.

5. The cooling circuit according to claim 1, wherein at least in a region of said junction location and branch-off location said main circuit is formed by a main channel, said feed is formed by a feed channel and said return is formed by a return channel, and a first axial section of said main channel, which viewed in the flow direction of the cooling medium in main circuit is located immediately upstream from the branch-off location, parallel to an axial direction of an axial section of the feed channel that connects directly to the branch-off location.

6. The cooling circuit according to claim 5, wherein said main channel includes a second axial section which viewed in the flow direction of the cooling medium in said main circuit is located immediately downstream from the branch-off location, said second axial section at least partially surrounds said axial section of said feed channel in a circumferential direction.

7. The cooling circuit according to claim 5, wherein said main channel includes a second axial section which viewed in the flow direction of the cooling medium in the main circuit is located immediately downstream from the branch-off location and proceeds parallel to an axial direction of an axial section of said return channel that connects directly with the junction location.

8. The cooling circuit according to claim 1, wherein at least in a region of said junction location and said branch-off location, said main circuit is formed by a main channel, said feed is formed by a feed channel and said return is formed by a return channel, and a first axial section of said main channel which viewed in the flow direction of the cooling medium in the main circuit is located immediately upstream from the branch-off location, parallel to an axial direction of a second axial section of said main channel which viewed in the flow direction of the cooling medium in the main circuit is located immediately downstream from the branch-off location.

9. The cooling circuit according to claim 8, wherein an axial section of the feed channel that connects directly to the branch-off location proceeds parallel to an axial direction of an axial section of the return channel that connects directly to the junction location.

10. The cooling circuit according to claim 9, wherein said axial section of the return channel is positioned offset in an axial direction relative to the axial section of feed channel.

11. The cooling circuit according to claim 8, wherein said first axial section and said second axial section of the main channel connect directly with each other and thus form a linear flow channel having a uniform cross section.

12. The cooling circuit according to claim 1, wherein at least one of said feed and said return have a smaller flow cross-section than said main circuit.

13. The cooling circuit according to claim 1, wherein said branch-off location and said junction location are positioned after the cooling medium pump in the flow direction of the cooling medium in said main circuit.

14. The cooling circuit according to claim 1, wherein said branch-off location and said junction location are positioned before the drive motor in the flow direction of the cooling medium in said main circuit.

15. The cooling circuit according to claim 1, wherein said main circuit includes a pipe socket having an outlet end that at least partially protrudes into a flow of said cooling medium in the main circuit, said return ends in said pipe socket in said main circuit.

16. The cooling circuit according to claim 1, wherein said secondary branch of the cooling circuit includes a bypass configured to bypass the hydrodynamic retarder, said bypass branches off from the feed and discharges into the return, and said bypass does not include at least one valve.

17. The cooling circuit according to claim 1, wherein said feed includes a shut-off valve for selective release or shut-off of a flow cross-section of the cooling medium to said hydrodynamic retarder.

18. The cooling circuit according to claim 1, wherein said return includes a control valve for variable adjustment of a flow cross-section of the cooling medium leaving said hydrodynamic retarder.

19. The cooling circuit according to claim 1, wherein said cooling medium pump includes a spiral channel, and said return and said feed are both connected to said spiral channel of the cooling medium pump.

20. The cooling circuit according to claim 1, wherein said main circuit has a larger flow cross section at said branch-off location of the feed than at said junction location of the return.

* * * * *